United States Patent
Winegard

(10) Patent No.: US 7,539,421 B2
(45) Date of Patent: *May 26, 2009

(54) SELF-CONTAINED SECURE VIDEOCONFERENCING CONSOLE

(75) Inventor: Robert Winegard, Laurel, MD (US)

(73) Assignee: CritiCom Critical Communication, Lanham, MD (US)

( * ) Notice: Subject to any disclaimer, the term of this patent is extended or adjusted under 35 U.S.C. 154(b) by 300 days.

This patent is subject to a terminal disclaimer.

(21) Appl. No.: 11/140,209

(22) Filed: May 27, 2005

(65) Prior Publication Data

US 2009/0087178 A1    Apr. 2, 2009

Related U.S. Application Data

(63) Continuation-in-part of application No. 10/733,125, filed on Dec. 11, 2003.

(60) Provisional application No. 60/432,478, filed on Dec. 11, 2002, provisional application No. 60/574,813, filed on May 27, 2004.

(51) Int. Cl.
  *H04B 10/12*  (2006.01)
  *H04N 7/14*   (2006.01)
  *H04N 7/16*   (2006.01)

(52) U.S. Cl. .................. 398/141; 398/115; 348/14.08; 725/26

(58) Field of Classification Search ............. 398/45, 398/55, 141, 115; 348/14.08; 725/26; 307/132 E; 340/644; 375/352; 385/22
See application file for complete search history.

(56) References Cited

U.S. PATENT DOCUMENTS

| 4,903,298 | A  | * | 2/1990 | Cline | ............ | 380/270 |
| 5,666,402 | A  | * | 9/1997 | Griffin | ........... | 379/56.2 |
| 6,202,153 | B1 | * | 3/2001 | Diamant et al. | ..... | 726/35 |
| 6,578,089 | B1 | * | 6/2003 | Simpson et al. | ..... | 709/249 |
| 6,643,783 | B2 | * | 11/2003 | Flyntz | ............. | 726/9 |
| 6,763,226 | B1 | * | 7/2004 | McZeal, Jr. | ........ | 455/90.2 |
| 2005/0025302 | A1 | * | 2/2005 | Schmid et al. | ..... | 379/221.15 |

OTHER PUBLICATIONS

Cycomm-1000 Series Voice Scrambler brochure, CYCOMM, Inc., 1988.*

* cited by examiner

*Primary Examiner*—Nathan M Curs
(74) *Attorney, Agent, or Firm*—The Farrell Law Firm, PC

(57) ABSTRACT

Disclosed is a secure/non-secure bypass switch, including at least one input port for receiving signals; a control module for determining if a secure or a non-secure operating mode is selected; if a non-secure mode is selected, configuring at least one relay to route the signals through at least two fiber optic modems; and if a secure mode is selected, configuring the at least one relay to route the signals through an encryption device.

13 Claims, 2 Drawing Sheets

SELF-CONTAINED SECURE VIDEOCONFERENCING CONSOLE

BENEFIT CLAIMS

This application is a continuation-in-part of application Ser. No. 10/733,125, filed Dec. 11, 2003 which claims the benefit of U.S. Provisional Application No. 60/432,478 filed on Dec. 11, 2002, and this application claims the benefit of U.S. Provisional Application No. 60/574,813 filed on May 27, 2004, the contents of each of which are incorporated herein by reference.

TECHNICAL FIELD

The present invention relates generally to security systems and more particularly to a bypass switch for secure and non-secure video conferencing.

BACKGROUND

Teleconferencing systems allow virtual meetings among two or more remotely located participants to take place using public switched telephone networks (PSTN) or data networks. Data networks can include local area networks (LAN), wide area networks (WAN), the Internet, etc. A simple teleconference may involve audio conferencing in which the participants share a speakerphone over one or more of the aforementioned networks. In addition to the audio capabilities, a more sophisticated teleconference may involve videoconferencing in which participants can see images of one another during the conference.

Videoconferencing typically utilizes non-secure data lines for routing communications data among the participants. Accordingly, due to the inherently unsecured nature of the typical network connections, if users need to communicate sensitive or classified data, special arrangements have to be made before the secured videoconferencing can take place. For example, in the United States (U.S.), the U.S. Department of Defense's Communication Security (COMSEC) and Electro-Magnetic Security (EMSEC) guidance and policy requirements for providing secure and non-secure applications require secure videoconferencing when communicating highly sensitive national security data.

Secure conferencing system installations, however, are traditionally labor intensive and require a site-survey and design by specialized secure integration engineers. In addition, the installations are usually designed with little consideration for ease of use. Frequently, a full time on-site technician is needed to complete the numerous "patches" and rerouting to transition between secure and non-secure connections. Thus, there is a need for a videoconferencing system (VTC) that enables users to perform videoconferencing in a secure and non-secure environment while maintaining features such as on-screen dialing for ease of use.

SUMMARY

To solve the foregoing problems, provided is a secure/non-secure bypass switch that includes at least one input port for receiving signals; a control module for determining if a secure or a non-secure operating mode is selected; if a non-secure mode is selected, configuring at least one relay to route the signals through at least two fiber optic modems; and if a secure mode is selected, configuring the at least one relay to route the signals through an encryption device.

Also provided is a method of secure/non-secure switching in a secure/non-secure bypass switch, that includes the steps of receiving signals to be routed; determining if a secure or a non-secure operating mode is selected; if a non-secure mode is selected, configuring at least one relay to route the signals through at least two fiber optic modems; and if a secure mode is selected, configuring the at least one relay to route the signals through an encryption device.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
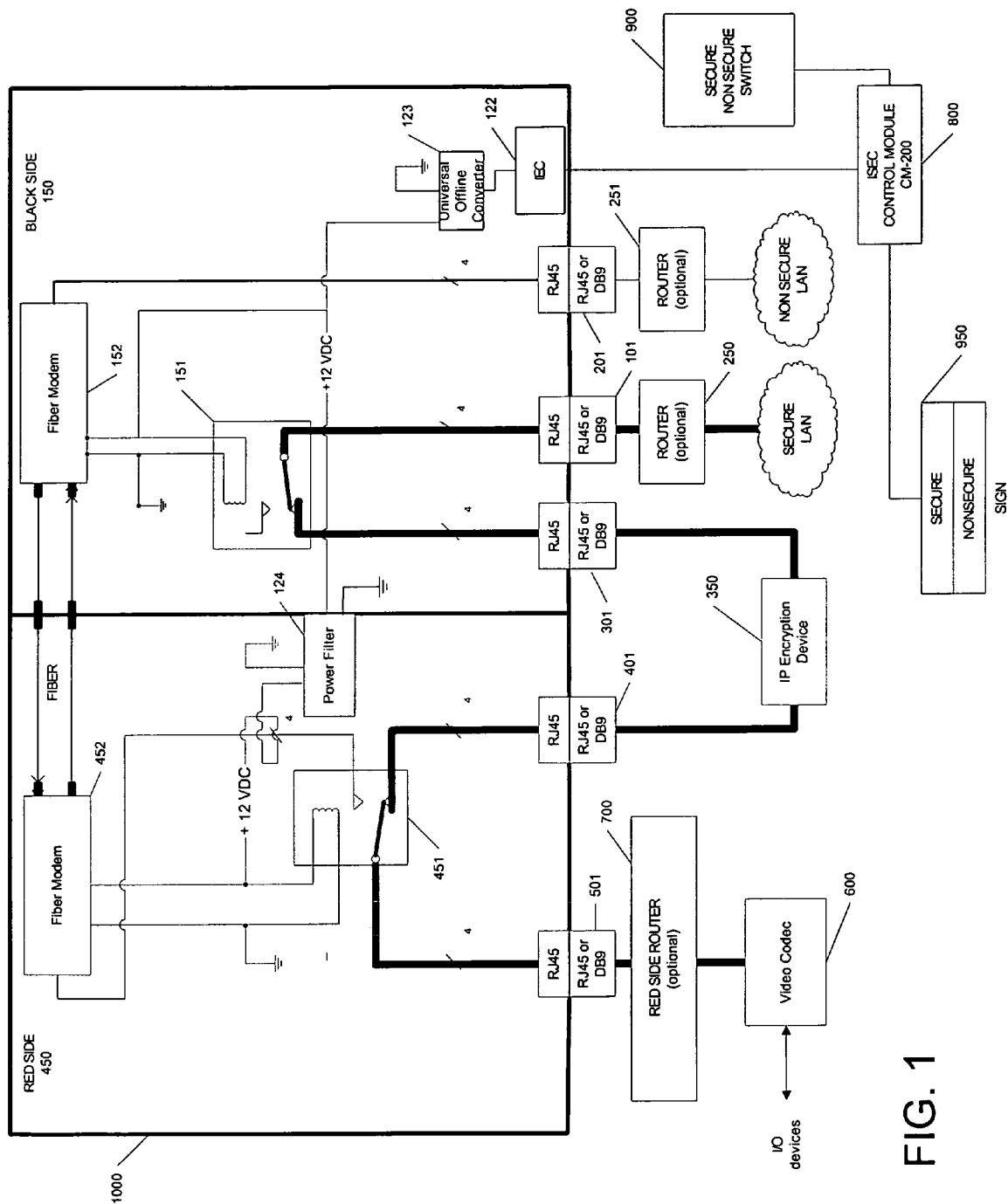
FIG. 1 is a diagram illustrating the secure/non-secure bypass switch according to an embodiment of the present invention.

Preferred embodiments of the present invention will be described in detail with reference to the drawings. In the following description of the present invention, a detailed description of known functions and configurations incorporated herein will be omitted when it may obscure the subject matter of the present invention.

Supplying videoconferencing that supports secure and non-secure videoconferencing within the same system requires compliance with COMSEC/EMSEC criteria. Essentially, the criteria require red/black signal separation and isolation as well as Tempest emanation management. The secure and non-secure operations are achieved by engineering systems so that non-encrypted sensitive classified data is not transmitted, intentionally or unintentionally, outside of the Tempest zone, which could lead to the potential interception by adversarial third parties.

The present invention is a self-contained secure console providing switch selectable secure and non-secure communications using a predetermined encoding standard. The present invention offers a standardized switch selectable secure/non-secure Internet protocol (IP) videoconferencing communications system.

The present invention integrates IP network termination equipment with encryption signal isolation for use with any Ethernet based IP encryptor, for example the KG 175 encryption device or Taclane currently manufactured by General Dynamics. Other encryption/decryption devices are contemplated. This integration creates a single user-friendly console to support switch selectable access to secure and non-secure Ethernet IP networks. The design enables clients to meet the U.S. Department of Defense COMSEC/EMSEC guidance and policy requirements while maintaining the ease of use features such as on-screen dialing and switch selectable security modes.

The present invention provides a standard commercial-off-the-shelf (COTS) solution for the installation of secure/non-secure IP video teleconferencing (VTC) systems at multiple locations throughout the world. The present invention optimizes particular communications, however, the communications can be extended beyond the basic design to support other protocols and applications. Future applications or protocols include, but are not limited to, Voice over IP (VoIP), session initiation protocol (SIP), other data networks or speeds other than 10/100 MB Ethernet, including Internet 2 and IPv6, and a secure/non-secure path for data terminals/PCs that require access to different security level data/voice or video. Current applications include cascading VWS-IPs to create a selection or network of three (3) or more. Typical examples of this include endpoints or equipment requiring access to multiple levels of secure data traffic, i.e. unclassified, Secret or Top Secret. Another configuration allows an endpoint access to secure data at times and by selection, and to isolate the endpoint from all IP networks. This is accomplished by connecting the secure network interface to a secure network and leaving the non-secure interface unconnected from any network. Any IP LAN domain or device that requires switching and isolation between secure and non-secure or any two physical IP LAN domains on a periodic basis is a candidate application.

The present invention provides a "turn-key" solution for clients requiring shared utilization of VTC systems in both secure and non-secure applications. Other applications such as providing a secure network switch between various network components are also contemplated.

The present invention employs fiber optic coupling, waveguide technologies and a secure/non-secure signal switching module (VWS-IP) design to provide failsafe certified separation and isolation. An incorporated mode indicator, for example a lighting system or other visual display, and toggle switch can be provided for additional visual confirmation of status, and further eliminates any opportunity for user error. Unlike systems built upon untested and unconfirmable manual A/B switching, the present invention provides verifiable failsafe compliance.

To overcome the shortcomings of existing secure/non-secure switches, and to address security issues for users that desire to utilize their video conferencing system in a secure or non-secure mode, the present invention has been developed. The bypass switch design according to the present invention addresses secure/non-secure video communications with the desire to meet and exceed COMSEC/EMSEC security criteria.

The present invention provides a reliable and failsafe bypass switch designed in a self-contained security console providing user-friendly, switch selectable, secure and non-secure communications. A typical system would integrate network termination equipment, the VWS-IP, encryption signal isolation, ISEC control module, Taclane or encryptor mounting rack, and a special mounting rack to create a single, user-friendly system.

The VWS-IP is a self-contained module allowing remote controlled switching between secure and non-secure paths while maintaining the highest degree of red/black separation. The VWS-IP can be contained in a rack mountable metal EMI/RFI housing. The housing would be divided into two separate chambers by an internal metal bulkhead. Secure/non-secure mode selection is accomplished with presence/absence of A/C power to the VWS-IP. Each chamber contains at least one set of 4 non-latching electro-mechanical relay contacts. The number of contacts depends on the signal formats being processed. The default (de-energized) relay state is the secure mode. During secure operation, the VWS-IP is a completely passive connection with no active electronics. In fact, it has no power applied. The separate EMI/RFI chambers provide shielding between the red and black signals contained within each compartment.

FIG. 1 is a diagram illustrating the secure/non-secure bypass switch according to an embodiment of the present invention. The present invention connects to both red (secure) and black (non-secure) Ethernet IP networks. The Ethernet networks terminate onto RJ-45/DB-9 connections contained on the system. This termination can be one of the optional routers 250 or 251, or connect directly to the VWS-IP switch network interfaces 101 and 201. The network interfaces 101 and 201 are designed to accommodate two types of networks that require isolation from each other. Typical examples are a secure and a non-secure network, but other configurations are possible including the option of having two types of secure networks and configuring the switch in reverse, e.g., have two endpoints, and the option of selecting one of the endpoints to connect to the network one at time.

For purposes of this description, the term "secure LAN network" typically describes a physical Ethernet RJ-45/DB-9 interface that carries various levels of classified (i.e., sensitive to Top Secret) data, and must be encrypted so that it can only be read after it has been decrypted by an encryption device with an appropriate key. Also for purposes of this document, the term "non-secure LAN Network" describes a physical Ethernet RJ-45/DB-9 interface that carries unclassified data that does not require an encryption device to decrypt the data but can be read by anyone receiving the data. For purposes of this document, the term "Red Data" is data that has been decrypted and can be viewed by anyone in the public domain. For purposes of this document, the term "Black Data" refers to data that has been encrypted for transmission and cannot be viewed in the public domain.

It is also contemplated that the Secure LAN network interface may be a trunk-encrypted network that has already been decrypted; hence the ISEC-IP would not contain a local encryptor as it is elsewhere in the network. In this scenario, a typical configuration would include a jumper cable between 301 and 401. The non-secure LAN interface 201 is typically designed for unclassified data or unencrypted information; the secure LAN interface 101 is typically designed for classified data or encrypted information; the encryptor Black side interface 301 is typically designed for connection to the encryptor black side or cipher text port; and, the encryptor Red side interface 401 is typically designed for connection to the encryptor Red side or the plain text port. The Video Codec port 501 is typically designed to connect to the video codec 600 or to an optional Red side router 700.

A user selects the mode of the present invention by positioning the tabletop Switch 900 into one of two modes, secure or non-secure. This causes the ISEC Control Module 800 to either apply or deny power to the VWS-IP switch 1000. This also illuminates the proper status on a wall sign 950 that denotes "SECURE" or "NON-SECURE." The denial or application of power is a core element to the design of the present invention. During secure operation, or Mode "A", there is no power applied to the switch and therefore no active path to the non-secure side, only the powered down fiber optic modems 452 and 152 and a dark or unlit fiber connection. This provides complete and thorough isolation between the Red 450 and Black 150 compartments. The actual data flow into the VWS-IP can include either a Red 700 or LAN side IP router (250 and/or 251) or both for IP address translation. For the purposes of this description, the routers are a convenience and are not material to this unique design.

The denial of power to the VWS-IP switch 1000 puts the switch into Mode "A" Secure. The secure network interface RJ-45/DB-9 Ethernet 101 is connected to an electronic A/B relay switch 151 in the VWS-IP that in the secure mode (VWS-IP power off mode) is in mode "A". This, by default, creates a data path from the Secure LAN interface 101 on the Black side of the VWS-IP 150 to the encryption device 350, using Ethernet RJ-45/DB-9 connection 301. The data path is then encrypted by the encryption device 350 with the plain text or decrypted data interface connected to the VWS-IP switch Ethernet RJ-45/DB-9 connection 401. The input from connection 401 is connected to a second A/B relay 451 on the Red side 450 of the VWS-IP, which defaults the data path to the codec port interface 501. Interface 501 can be directly connected to the codec device 600 or a Red side IP router 700, which provides the alias IP address translation to the codec. The router 700 can be used for many reasons including enabling the codec to have a bogus or false non-routable IP address or if data needs to be routed to subnet addresses on the network.

The application of power to the VWS-IP switch 1000 by the ISEC Control Module 800 puts the VWS-IP switch 1000 into Mode "B" Non Secure or the Powered mode. Black A/B relay switch 151 is open in mode "B" when power is applied. This opens the connection between 101 and 301 to provide a break in the signal path leading to the encryption device 350. The non-secure network RJ-45/DB-9 Ethernet interface is connected to the VWS-IP switch non-secure LAN interface 201 in the VWS-IP 1000, which in the non-secure mode (VWS-IP powered mode) is in mode "B". This interface is always connected to the Black side fiber optic modem 152 in the VWS-IP. The output light stream from the modem connects to the Black side bulkhead wave-guide connector via a fiber optic cable. The light output is then received on the Red side bulkhead connector into a Red side fiber, which is connected to the Red side fiber optic modem 452. The output of the Red side fiber optic modem 452 is routed to the Red side A/B switch relay 451 and, in the powered on mode "B", routes all data to the codec port 501 of the VWS-IP. Interface 501 can be directly connected to the codec device 600 or a Red side IP router 700, which provides the alias address translation to the codec. This router can be used for many reasons including enabling the codec to have a bogus or false non-routable IP address or if data needs to be routed to subnet addresses on the network.

In either the secure or non-secure mode, the video codec 600 is connected to I/O devices. These devices may include microphones, displays, speakers, etc.

The power supply also contains an IEC 122, universal offline converter 123, and power filter 124. Other power supply configurations are contemplated. The power supply applies current to the relays and the fiber-optic modems 452 and 152. If the system is operating in secure mode, the power to the fiber optic modems 452 and 152 is also terminated to prevent an unintended signal being conducted on the unencrypted path.

In the preferred embodiment, a user simply flips a switch on a tabletop switch module 900 into the "SECURE" or "NON-SECURE" mode. This triggers the system control module to perform several functions. Among them are:

A. In NON-SECURE mode:
 1. Power up the system VWS-IP sides 150 and 450, which in turn places the system into the non-secure mode, and
 2. Changes a security status indicator display 950 to "NON-SECURE".

B. In SECURE mode:
 1. Powers down the system VWS-IP sides 150 and 450 and places the system into the default secure mode, and
 2. Changes the security status indicator display 950 to "SECURE".

To prevent the unintentional disclosure of sensitive information during a non-secure conference in situations such as this, the system can include automated secure/non-secure status indicators. This provides a prominent visual reminder of the security level for the current conference.

Figure 2:
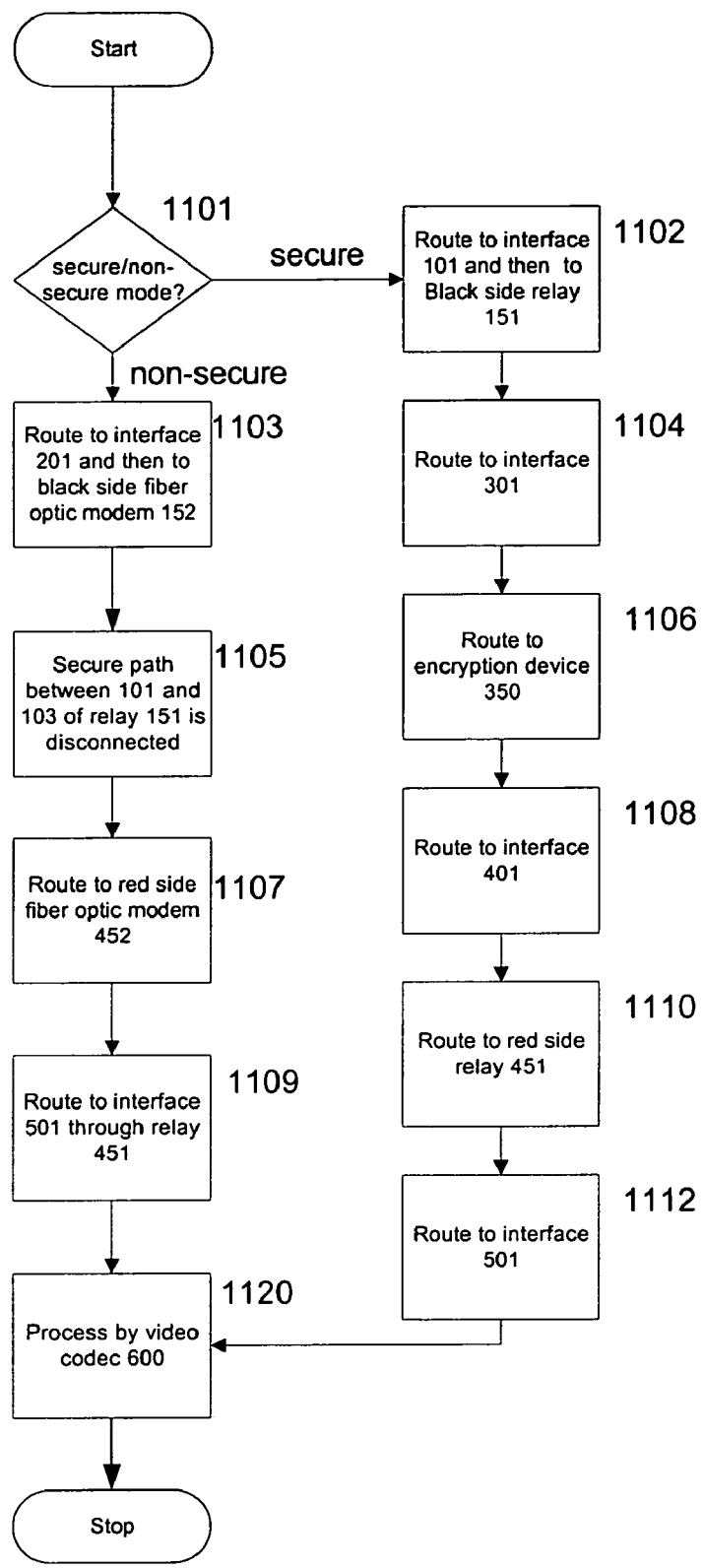
FIG. 2 is a flow diagram illustrating an operating method of the secure/non-secure bypass switch according to an embodiment of the present invention.

FIG. 2 is a flow diagram illustrating an operating method of the secure/non-secure bypass switch according to an embodiment of the present invention. At 1101 a determination is made as to whether the system is in a secure or non-secure mode. If it is determined at 1101 that the current mode is the non-secure mode, at 1103 the signals are received at interface 201 and then sent to the first or Black side fiber optic modem 152, and simultaneously relay 151 disconnects to the secure path between 101 and 301. At 1105 the signals are sent to the second or Red side fiber optic modem 452. At step 1107, signals pass through energized relay 451. At step 1107 in non-secure mode, the signals are routed from 451 to interface 501. Finally, the signals are processed by video codec 600. The reverse non-secure path processes signals in the reverse direction.

At 1101, if it is determined that the current mode is secure, the connection is switched to secure routing through the VWS-IP 1000, and routing is done via the encryption device 350. At 1102, the signal is received at interface 101 and then to black side relay 151. At 1104 the signal is routed to interface 301 through relay 151. At 1106 the signal is routed through encryption device 350 for encryption/decryption, and then to interface 401 at step 1108. Next at step 1110 the signal is routed to the Red side relay 451, and then routed through interface 501 at step 1112. Finally, in secure mode, the signal is sent to video codec 600 for processing. The reverse path processes secure signals in the reverse direction.

As stated earlier, human error can unintentionally defeat the most robust COMSEC/EMSEC countermeasures. The physical appearances of the VTC system will be the same in either mode of operation and a participant in a secure VTC may logically assume that they can freely discuss classified information on subsequent conferences over the same system. To prevent the unintentional disclosure of sensitive information during a non-secure conference, the system according to the present invention provides an automated secure/non-secure status indicator display. This provides a prominent visual reminder of the security level for the current conference.

The VWS-IP design increases the isolation and separation level by terminating all power during secure operation. The VWS-IP provides the convenience and ease of use of an electro-mechanically controlled switch while exceeding the electronic separation of manual red and black patch panels in separate EMI/RFI enclosures.

While the invention has been described with reference to several embodiments, it will be understood by those skilled in the art that the invention is not limited to the specific forms shown and described. Thus, various changes in form and details may be made therein without departing from the spirit and scope of the invention as defined by the appended claims.

What is claimed is:

1. A secure/non-secure bypass switch, comprising:
 a secure mode path, comprising:
  a first port connected to a secure network;
  a first relay connected to said first port;
  a second port connected to said first relay; and
  a third port;
 a non-secure mode path, comprising:
  a fourth port connected to a non-secure network;
  a first fiber optic modem connected to said fourth port; and
  a second fiber optic modem connected to said first fiber optic modem;

a second relay connected to said second fiber optic modem and said third port, and for routing signals through one of said secure mode path and said non-secure mode path; and a fifth port connected to said second relay for transceiving signals through one of said secure mode path and said non-secure mode path, wherein said second port and said third port are configured to connect there between an external encryption device for encrypting/decrypting said signals, and wherein an external controller determines if a secure or non-secure mode is selected and controls the routing of signals through one of the secure mode path and the non-secure mode path by controlling the supply of power to the switch.

2. The switch of claim 1, wherein the signals are routed through the secure path when no power is supplied to the switch, and the signals are routed through the non-secure path when power is supplied to the switch.

3. The switch of claim 1, wherein if the switch is operating in a non-secure mode, the first relay is opened, and the second relay connects the second fiber optic modem to the fifth port.

4. The switch of claim 1, wherein if the switch is operating in a secure mode, the first relay connects the first port to the second port, and the second relay connects the third port to the fifth port.

5. The switch of claim 1, wherein power is supplied to the first and second fiber optic modems only during non-secure mode operation.

6. The method of claim 1, wherein the signals are Internet protocol based signals.

7. A secure/non-secure bypass switch, comprising:
at least one input port for receiving signals;
if a non-secure operating mode is selected, configuring at least one relay to route the signals through at least two fiber optic modems; and if a secure operating mode is selected, configuring the at least one relay to route the signals through an external encryption device, wherein an external control module determines if the secure or the non-secure operating mode is selected and supplies power to the switch in the non-secure operating mode and disconnects power from the switch in the secure operating mode.

8. The secure/non-secure bypass switch of claim 7, wherein power is disconnected to the fiber optic modems in the secure mode.

9. The secure/non-secure bypass switch of claim 7, wherein the signals are Internet protocol based signals.

10. A method of secure/non-secure switching in a secure/non-secure bypass switch, comprising the steps of:
receiving signals to be routed;
controlling the supply of power to the switch based on an external determination of whether a secure or a non-secure operating mode is selected;
if a non-secure operating mode is selected, supplying power to the switch and configuring at least one relay to route the signals through at least two fiber optic modems; and
if a secure operating mode is selected, disconnecting power from the switch and configuring the at least one relay to route the signals through an encryption device.

11. The method of claim 10, wherein if no power is supplied to the bypass switch the secure mode is selected.

12. The method of claim 10, further comprising the step of disconnecting power to the fiber optic modems in the secure mode.

13. The method of claim 10, wherein the signals are Internet protocol based signals.

* * * * *